United States Patent
Bradley et al.

(10) Patent No.: US 10,306,586 B2
(45) Date of Patent: May 28, 2019

(54) COORDINATED NOTIFICATIONS

(71) Applicant: APPLE INC., Cupertino, CA (US)

(72) Inventors: Bob Bradley, San Jose, CA (US);
James B. Cary, Cupertino, CA (US);
Marc J. Krochmal, Santa Clara, CA
(US); Matthew E. Shepherd, Mountain
View, CA (US); Neil G. Crane,
Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/179,747

(22) Filed: Jun. 10, 2016

(65) Prior Publication Data

US 2017/0359797 A1    Dec. 14, 2017

(51) Int. Cl.
| | |
|---|---|
| *H04W 68/00* | (2009.01) |
| *H04L 12/58* | (2006.01) |
| *H04L 29/08* | (2006.01) |
| *H04W 68/10* | (2009.01) |
| *H04M 1/60* | (2006.01) |
| *H04W 4/38* | (2018.01) |
| *H04W 4/80* | (2018.01) |

(52) U.S. Cl.
CPC ........... *H04W 68/005* (2013.01); *H04L 51/24* (2013.01); *H04L 51/38* (2013.01); *H04L 67/22* (2013.01); *H04L 67/306* (2013.01); *H04M 1/6066* (2013.01); *H04W 4/38* (2018.02); *H04W 4/80* (2018.02); *H04W 68/10* (2013.01); *H04M 2250/02* (2013.01)

(58) Field of Classification Search
CPC ...... H04W 68/005; H04L 51/24; H04L 51/38; H04L 67/22; H04L 67/306
USPC ...................... 455/412.2, 420, 417
See application file for complete search history.

(56) References Cited

U.S. PATENT DOCUMENTS

| | | | |
|---|---|---|---|
| 6,359,557 B2 | 3/2002 | Bilder | |
| 7,206,788 B2 | 4/2007 | Horvitz et al. | |
| 8,559,932 B2 | 10/2013 | Elliott et al. | |
| 9,699,131 B2 | 7/2017 | Malkin et al. | |
| 2004/0210628 A1* | 10/2004 | Inkinen | H04L 29/06 709/201 |
| 2007/0190995 A1* | 8/2007 | Wang | H04M 1/72552 455/419 |
| 2007/0197263 A1 | 8/2007 | Gudmand-Hoyer et al. | |
| 2009/0232034 A1 | 9/2009 | Li et al. | |
| 2012/0023212 A1 | 1/2012 | Roth et al. | |

(Continued)

FOREIGN PATENT DOCUMENTS

| | | |
|---|---|---|
| EP | 2375709 A1 | 10/2011 |
| WO | 2015/072659 A1 | 5/2015 |

*Primary Examiner* — Said M Elnoubi
(74) *Attorney, Agent, or Firm* — Invoke

(57) ABSTRACT

A device may broadcast an indication of an activity level of the device. The device may also receive a notification of an incoming message and receive at least one broadcast from at least one additional device also receiving the notification of the incoming message including an indication of at least one activity level of the at least one additional device. The device may compare its own activity level with the received at least one activity level. In response to determining that the activity level of the device is equal to or greater than a highest received at least one activity level, the device may display the notification of the incoming message.

18 Claims, 10 Drawing Sheets

(56) References Cited

U.S. PATENT DOCUMENTS

| | | | |
|---|---|---|---|
| 2012/0115451 A1* | 5/2012 | Roka | H04M 3/42 |
| | | | 455/417 |
| 2012/0136942 A1 | 5/2012 | Amidon et al. | |
| 2012/0191973 A1 | 7/2012 | Ardon et al. | |
| 2013/0244633 A1 | 9/2013 | Jacobs et al. | |
| 2014/0176310 A1 | 6/2014 | Kotlicki et al. | |
| 2014/0207880 A1 | 7/2014 | Malkin et al. | |
| 2014/0256298 A1* | 9/2014 | Moss | H04W 4/12 |
| | | | 455/414.1 |
| 2015/0319144 A1 | 11/2015 | Barton et al. | |
| 2015/0350355 A1 | 12/2015 | Linn et al. | |
| 2015/0373666 A1 | 12/2015 | Malahy et al. | |
| 2016/0037482 A1* | 2/2016 | Higgins | H04W 68/005 |
| | | | 455/414.1 |
| 2016/0212725 A1 | 7/2016 | Qiu | |
| 2016/0354285 A1 | 12/2016 | Nolan et al. | |

* cited by examiner

US 10,306,586 B2

COORDINATED NOTIFICATIONS

TECHNICAL FIELD

The disclosure generally relates to selecting a device for delivering a notification to a user.

BACKGROUND

Computing devices such as personal computers, smart phones, tablets, and other devices are commonly available, and many users own and/or use multiple computing devices. Computing devices often notify users with an audio and/or visual notification for a variety of reasons, such as to indicate incoming messages, alarms, calendar events, or the like. In some situations, such as when a user is logged into a user account with multiple devices, each device may have access to the same triggering information (e.g., message incoming, scheduled event on shared calendar, etc.), and each device may attempt to notify the user.

SUMMARY

In some embodiments, computing devices may be configured to coordinate notification presentation with other computing devices. Each of a plurality of devices may receive the same notification data (e.g., an incoming message for a user of each of the devices). The devices may share device activity level information with one another. Using this information, each device may individually determine whether it has the highest activity level among all the devices. The device having the highest activity level may present the notification to the user, for example by presenting an audible and/or visible alert.

Particular implementations provide at least the following advantages: A user may receive fewer notifications, only receiving notifications from a most active (and thus most likely to be noticed) device. Devices may present fewer notifications, thereby preserving battery life and/or reducing processing demands. Devices may communicate activity level data among themselves according to a ranked activity scale, which may provide information useful for additional tasks besides notification decision making.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Figure 1A:
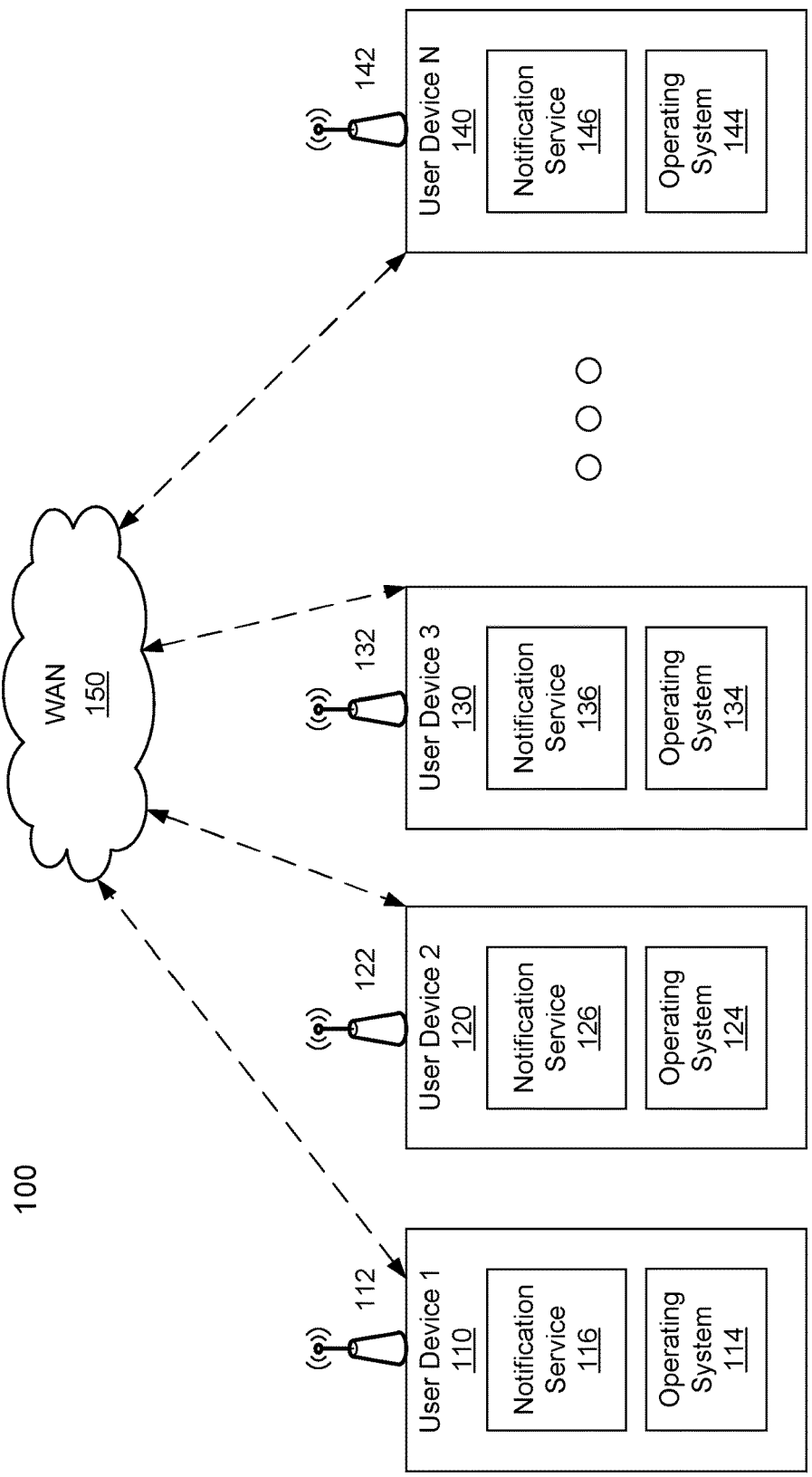
FIG. 1A is an example system for coordinating notifications among devices.

FIG. 1A illustrates an example system 100 including a plurality of computing devices. A computing device may be one of a variety of electronic devices including, but not limited to, laptop computers, desktop computers, computer terminals, television systems, tablet computers, e-book readers, smart phones, watches, wearable computers, and in-car computers. Two or more computing devices, such as device 1 (e.g., a laptop computer) 110, device 2 (e.g., a tablet) 120, device 3 (e.g., a smart phone) 130, and device N (e.g., a desktop computer) 140 may be in proximity with one another. Devices 110/120/130/140 may all be associated with a user account. A user may have logged into the account on each device 110/120/130/140 and/or registered each device 110/120/130/140 with the account. Each device may include at least one wireless transceiver 112/122/132/142, for example a Bluetooth low energy (BTLE) transceiver or other transceiver. Devices may be considered to be in proximity with one another when they are in communication range of one another through their respective BTLE transceivers. In addition to communicating with one another using BTLE, devices 110/120/130/140 may optionally connect with a local area network (LAN) and/or wide area network (WAN) 150. For example, devices 110/120/130/140 may access the Internet, a cellular network, and/or another network 150.

Each device 110/120/130/140 may include an operating system 114/124/134/144 configured to facilitate general device operation and user interaction with the device. The operating system 114/124/134/144 may include a notification service 116/126/136/146 configured to receive, process, and display notifications to a user. In some embodiments, the notification service 116/126/136/146 may be a separate application from the operating system itself.

Figure 1B:
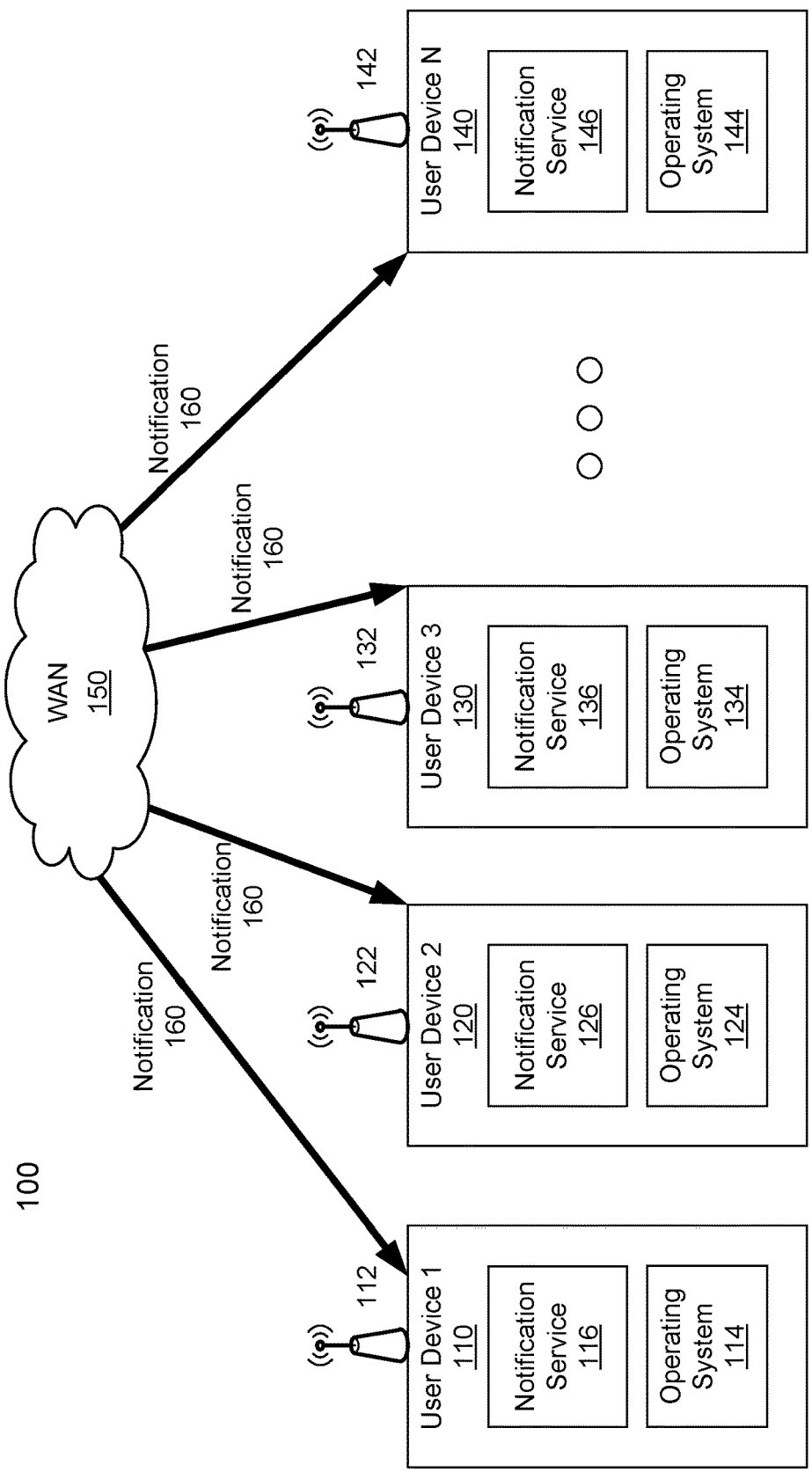
FIG. 1B is an example system for coordinating notifications among devices wherein the devices receive notification data.

As shown in FIG. 1B, devices 110/120/130/140 may receive notification information 160 from the network 150. As noted above, devices 110/120/130/140 may all be associated with a user account. Accordingly, any time a message is sent to the user on the network 150, each device 110/120/130/140 may receive notification information 160 regarding the message. For example, emails, text messages, phone calls, calendar events, app-specific events, or other occurrences may generate notification information 160 configured to trigger notifications at devices 110/120/130/140. In some embodiments, only certain notification types (e.g., phone calls and text messages) may be coordinated.

Figure 1C:
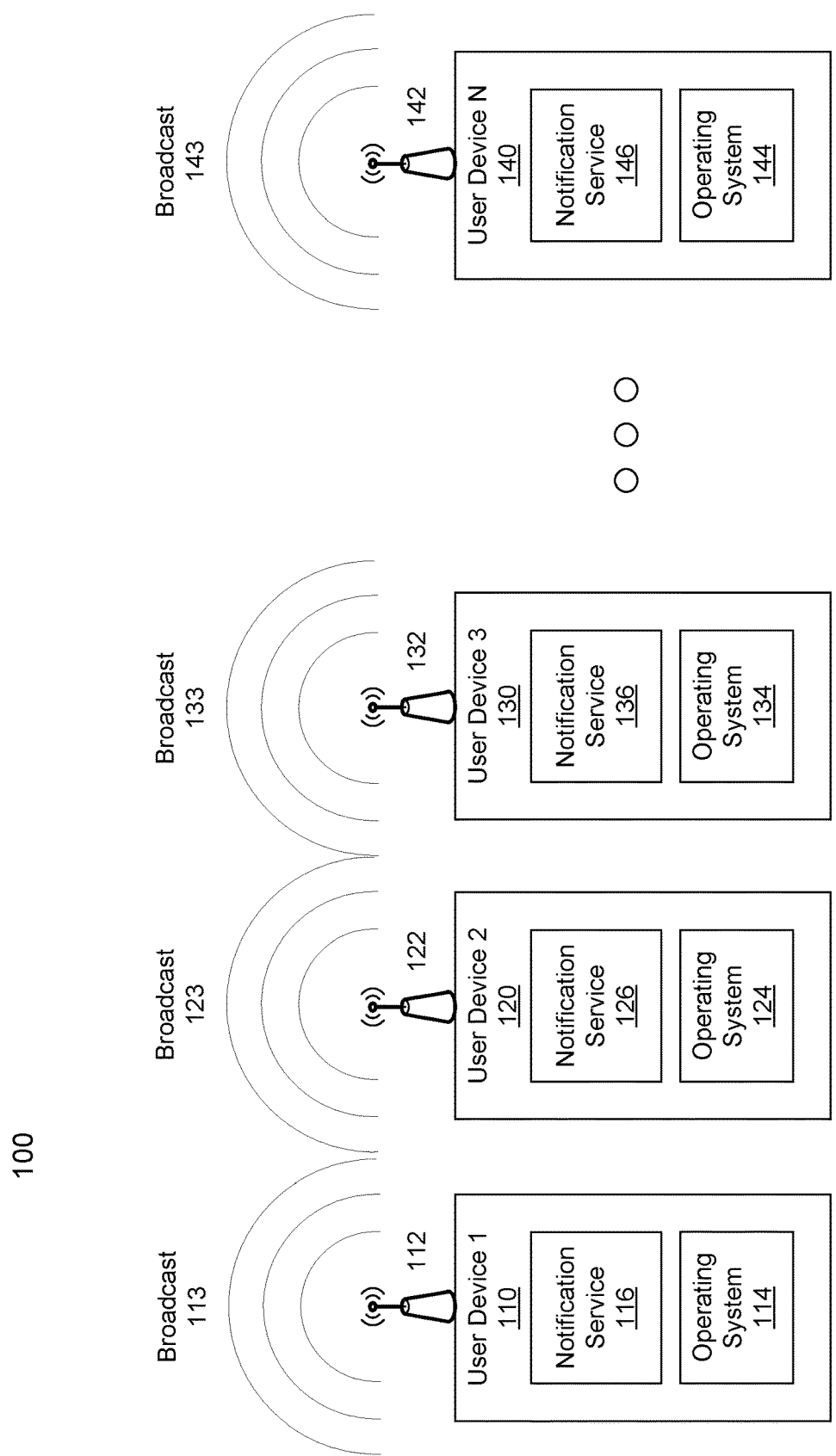
FIG. 1C is an example system for coordinating notifications among devices wherein the devices broadcast activity data.

Devices 110/120/130/140 may also broadcast information about themselves 113/123/133/143, as shown in FIG. 1C. For example, device 110 can encode information 113 into a Bluetooth advertising packet that other devices 120/130/140 may receive and decode to determine the status or state of device 110. Information 113/123/133/143 may be broadcast periodically and/or in response to receiving notification information 160. Devices 110/120/130/140 may encrypt broadcast information 113/123/133/143 so that only other devices 110/120/130/140 associated with the same user may be able to decrypt and read the information in the broadcast 113/123/133/143. Any encryption/decryption technology may be used.

In some embodiments, information 113/123/133/143 may be inserted into BTLE beacon data also used by other processes. Some devices in network 100 may periodically transmit a beacon payload. A beacon may be, for example, a BTLE advertising packet periodically transmitted by device 120. The beacon may include continuity data facilitating transfer of application operational states between devices. Other devices may likewise periodically transmit beacon data for similar functions or other reasons. The packet may include, for example, an activity identifier identifying a first application and the activity performed in the first application, a flag that is used to indicate when the activity identifier includes a representation of domain name for an online resource related to the activity, a timestamp for the activity/activity information, and/or other data. Information 113/123/133/143 may be inserted into a transmission including beacon data or other beacon data. For example, information 113/123/133/143 may be encoded into a beacon advertising packet. In some embodiments, information 113/123/133/143 may be inserted into a periodically transmitted activity advertisement message of the type described in U.S. Publication No. 2015/0350355, entitled "Activity Continuation Between Electronic Devices," and U.S. Publication No. 2015/0373084, entitled "Forwarding Activity-Related Information From Source Electronic Devices to Companion Electronic Devices," the entirety of each of which is incorporated by reference herein. In other embodiments, information 113/123/133/143 may be inserted into adaptable schema based payloads of the type described in U.S. application Ser. No. 15/179,676, entitled "Adaptable Schema Based Payloads."

Broadcast information 113/123/133/143 may include an activity level for the device 110/120/130/140. For example, each device 110/120/130/140 may be engaged in one or more activities, such as being coupled to an in-car computer system, being coupled to a smartwatch, being currently in use by the user, currently displaying audio and/or video content, being idle, etc. Each activity may be associated with a rank, such as a numerical rank on a ranking scale. Based on the activity or activities in which they are engaged, each device 110/120/130/140 may determine its own activity level and include information about the determined activity level in the broadcast information 113/123/133/143.

Figure 1D:
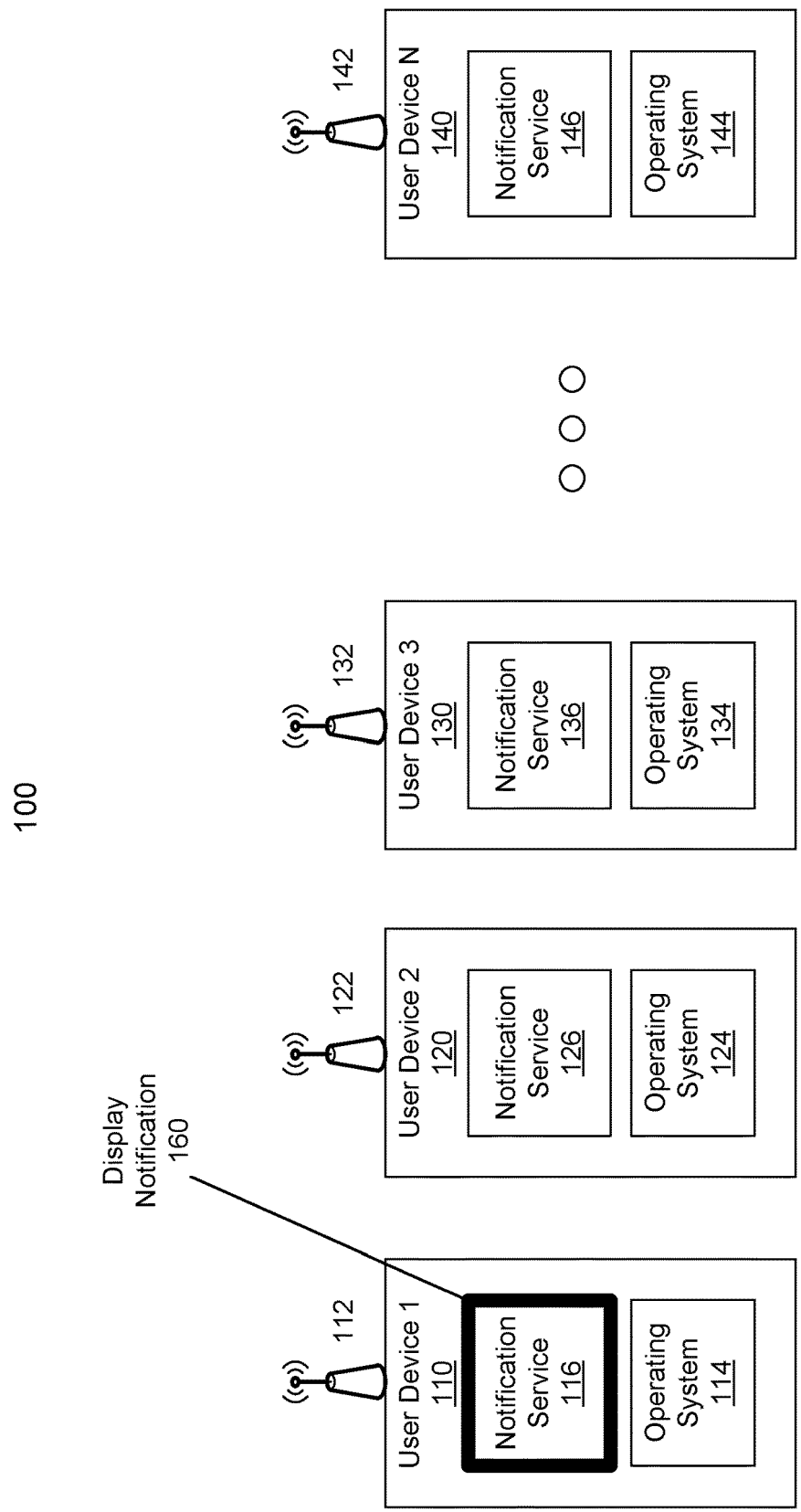
FIG. 1D is an example system for coordinating notifications among devices wherein a most active device displays a notification.

Each device 110/120/130/140 may compare its own activity level with information about other device 110/120/130/140 activity levels received from the broadcasts 113/123/133/143. By so doing, each device 110/120/130/140 may know whether it is the most active device 110/120/130/140. As shown in FIG. 1D, only the device 110 that determines itself to be the most active device through comparing its activity level with activity levels of other devices 120/130/140 may actually display notification 160. When another device 120 performs the same comparison, it may determine that its own activity level is lower than that of device 110 and may therefore not display notification 160. If multiple devices both arrive at an equal, highest activity level, they may each display notification 160.

Device 110 may display notification 160 in one or more ways, for example by emitting an audible indication, displaying a visual indication on an included display, flashing a light, vibrating, causing a connected device (e.g., an in-car system or a watch) to display an alert, and/or in any other manner that may attract a user's attention.

Example Processes

Figure 2A:
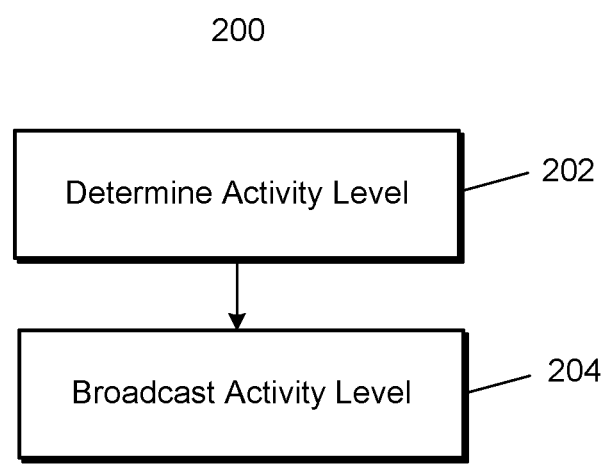
FIG. 2A is a flow diagram of an example process for broadcasting activity data.

FIG. 2A is a flow diagram of an example process 200 for broadcasting activity data. The following discussion uses device 110 for illustration purposes, but any device 110/120/130/140 may broadcast activity data using this process 200. Device 110 may perform this process 200 periodically, regardless of whether a notification has been received.

In step 202, device 110 may determine its activity level. Device 110 memory may store ranking information for several device 110 activities. Device 110 may be performing one or more of the activities at the time at which the activity level is being determined. Device 110 may assign the rank of the highest-ranked activity it is currently performing as its activity level. For example, the ranking information may include a numeric scale wherein a lowest number (e.g., 1) indicates a lowest activity ranking and a highest number (e.g., 13) indicates a highest activity ranking. Rankings may be preset or user-defined in order to give high ranks to devices on which a user is most likely to see a notification. For example, devices connected to in-car systems or watches may be highly noticeable to the user and may therefore have high ranks. Likewise, devices that have recently registered user activity may be in active use or may be near a user, and may therefore have relatively high ranks. On the other hand, devices that have been idle for a long time may be more likely to be ignored by a user and may therefore receive low ranks. In some embodiments, the ranking scale may be reversed such that 1 is the highest rank. In other embodiments, other ranking systems may be used. In any case, the ranks may be assigned to various activities, allowing device 110 to detect a current activity and rank itself according to the scale.

For example, device 110 may be connected to an in-car (or other vehicle) computer system. Device 110 and in-car computer system may connect with one another using Bluetooth or other wired or wireless communication technology. The in-car system may allow a user to control device 110 functionality through an in-car interface such as a touchscreen or other input on the car's dashboard, console, or steering wheel, for example. In some embodiments, device's 110 connection with the in-car system may be a high-ranking activity (e.g., rank 13). The scale may rank the in-car connection highly under the assumption that providing notifications through a vehicle display may minimize driver distraction.

Device 110 may be connected to a smartwatch or other secondary device extending the functionality of device 110. Device 110 and smartwatch may connect with one another using Bluetooth or other wired or wireless communication technology. Smartwatch may display notifications received by device 110, accept user inputs to device 110, and/or provide other functionality, for example. In some embodiments, device's 110 connection with the smartwatch may be a relatively high-ranking activity but may be ranked below an in-car connection (e.g., rank 12). The scale may rank the smartwatch connection highly under the assumption that a user of a smartwatch may prefer receiving notifications at the smartwatch.

A user may be actively interacting with device 110 or may have recently done so. For example, device 110 may have registered a user input (e.g., through a touchscreen or other input device) within a specified time period (e.g., within the last 25 seconds). In some embodiments, device's 110 recent use may be a relatively high-ranking activity but may be ranked below in-car and smartwatch connections (e.g., rank 11). The scale may rank recent activity highly under the assumption that a user may likely notice a notification at a device 110 in use.

Device 110 may rank other activities in some embodiments. For example, ranked activities may include device 110 currently playing video, device 110 currently playing audio, device 110 idle (e.g., no user input for at least a specified length of time), device 110 in motion (e.g., based on GPS and/or gyroscope activity), device 110 receiving audible inputs (e.g., through a device 110 microphone), device 110 receiving visual inputs (e.g., through a device 110 camera), and/or other activities. In some embodiments, these activities may be ranked in any order relative to one another but below in-car connection, smartwatch connection, and recent user interaction.

The aforementioned ranked activities and rankings are examples only, and device 110 may determine its activity level in other ways and/or according to other ranking schemes in other embodiments.

In step 204, device 110 may broadcast the determined activity level. For example, the activity level may be inserted into a Bluetooth (e.g., Bluetooth Low Energy (BTLE)) advertising packet also used by other processes to advertise state as described above. Process 200 may be repeated periodically (e.g., at a regular interval of a few seconds, or one minute, or the like). In some embodiments, process 200 may be triggered by a change in device 110 activity. For example, if device 110 is connected to an in-car system or a smartwatch, device 110 may update its activity level (see step 202) and broadcast the updated activity level (see step 204).

Figure 2B:
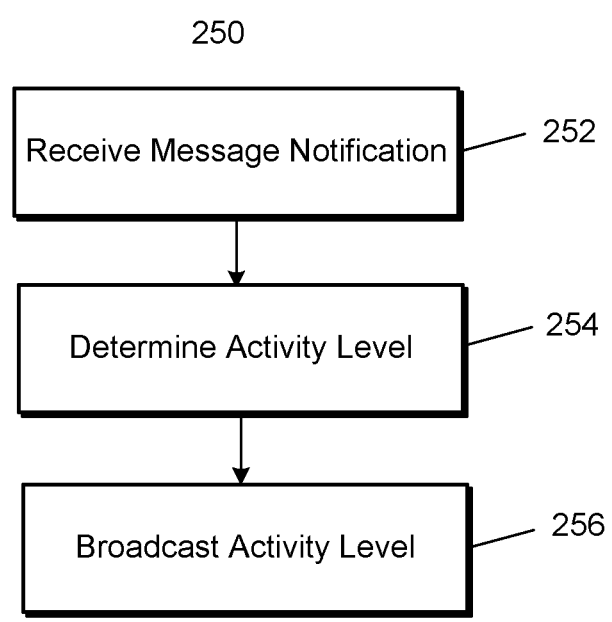
FIG. 2B is a flow diagram of an example process for broadcasting activity data upon receipt of notification data.

FIG. 2B is a flow diagram of an example process 250 for broadcasting activity data upon receipt of notification data. In some embodiments, device 110 may determine and broadcast its activity level as in steps 202 and 204 of process 200, but the determination and broadcasting may be triggered by receipt of a notification. Process 250 may be performed instead of process 200 in some embodiments, or process 250 may be supplemental to process 200, for example to ensure that the device 110 broadcasts a most recently derived activity level when a notification is coming in.

In step 252, device 110 may receive a notification to be displayed by device 110 or another device 120/130/140. In step 254, device 110 may determine its activity level in a manner similar to the determination described in step 202 of FIG. 2A. In step 256, device 110 may broadcast its activity level in a manner similar to the broadcasting described in step 204 of FIG. 2A.

In some situations, a specific device 130 may be preferred over other devices 110/120/140 for notification display. For example, a smartphone, such as device 130, may be the preferred device for notifying a user of an incoming phone call, even when its activity level is otherwise ranked below that of one or more other devices 110/120/140. A user may be able to configure which device should receive specific types of notifications in some embodiments. For example, the user may adjust a user setting in a profile using one of the devices (e.g., smartphone 130) to cause text messages to appear on device 130 even when its activity level is otherwise ranked below that of one or more other devices 110/120/140.

Figure 3A:
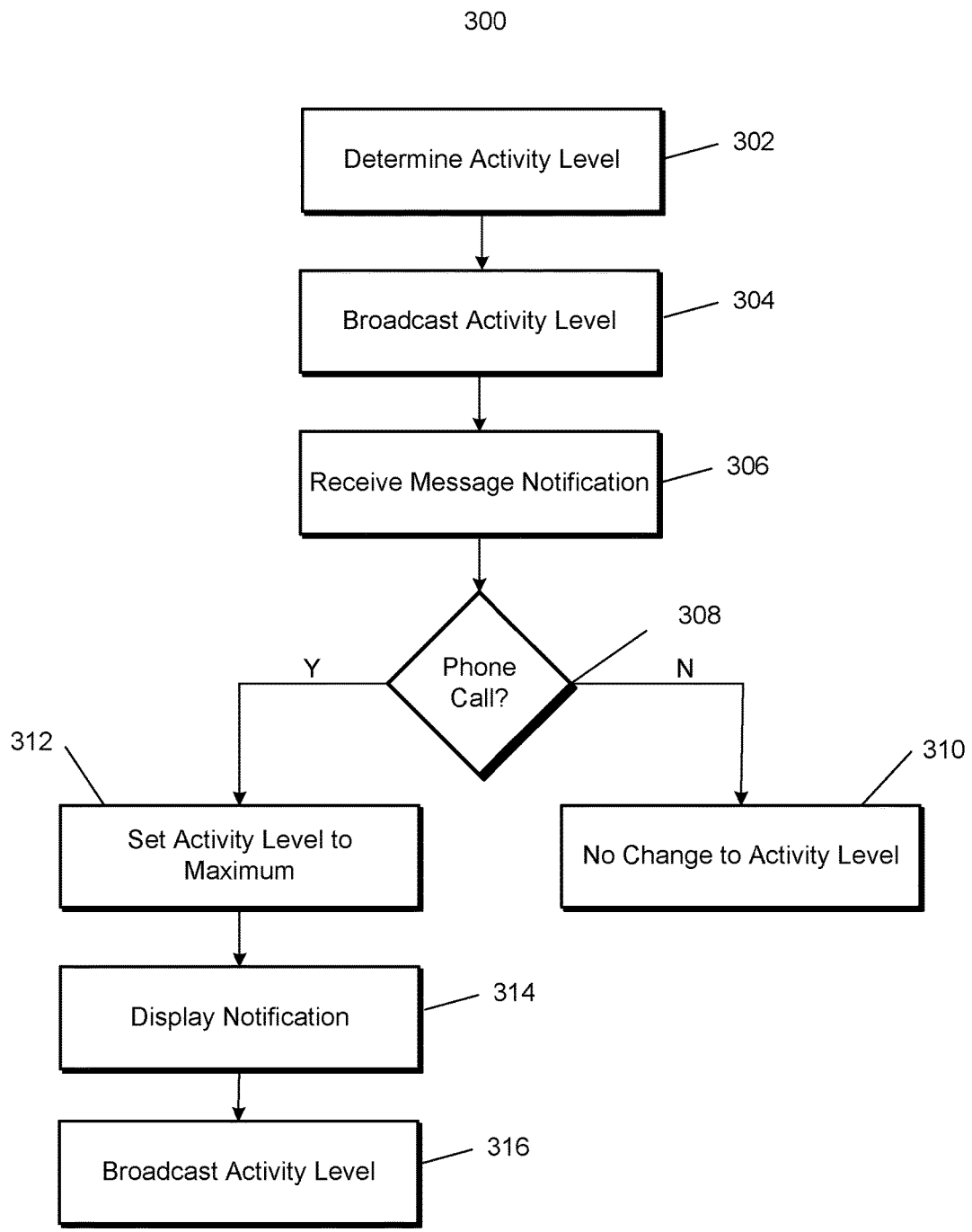
FIG. 3A is a flow diagram of an example process for coordinating notifications with a smartphone.

FIG. 3A is a flow diagram of an example process 300 for coordinating notifications when one device 130 is preferred. In this example, the preferred device 130 is a smartphone, and the incoming communication is a phone call, but other devices 110/120/140 may be preferred in other situations. For example, a notification pertaining to a specific application only present on one of the devices 110 may be preferably received at that device 110.

In step 302, device 130 may determine its activity level in a manner similar to the determination described in step 202 of FIG. 2A. In step 304, device 130 may broadcast its activity level in a manner similar to the broadcasting described in step 204 of FIG. 2A.

In step 306, device 130 may receive notification data. In step 308, device 130 may determine whether the notification data indicates an incoming phone call. If not, device 130 may proceed to step 310 and make no further change to its activity level based on the nature of the notification. Device 130 may proceed as described in FIG. 4 below.

However, when the notification data indicates an incoming phone call, device 130 may proceed to step 312. In step 312, device 130 may set its activity level to a maximum value higher than the highest value in the activity scale (e.g., a rank of 14).

Because device 130 may necessarily have the highest possible activity rank after setting its activity level to a maximum value available, in step 314, device 130 may display the notification.

Figure 4:
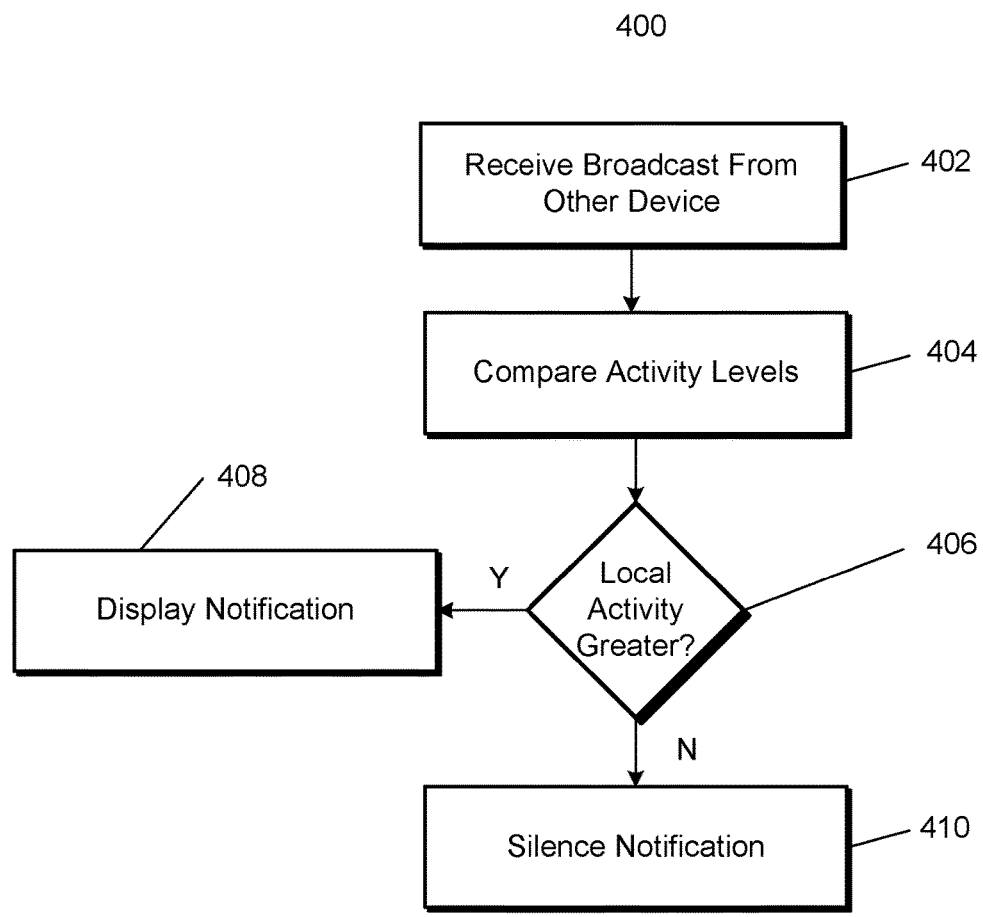
FIG. 4 is a flow diagram of an example process for coordinating notifications.

In step 316, device 130 may broadcast its newly set maximum activity level, which may enable notification suppression at other devices 110/120/140 as described in detail with respect to FIG. 4.

Figure 3B:
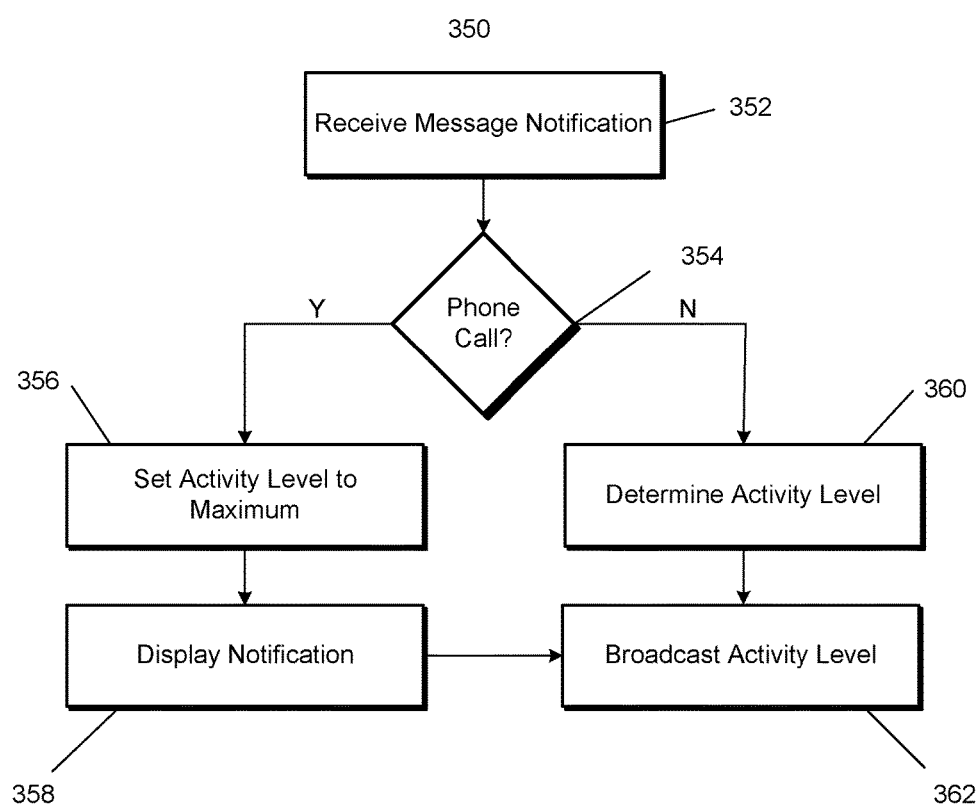
FIG. 3B is a flow diagram of an example process for coordinating notifications with a smartphone.

FIG. 3B is a flow diagram of an example process 350 for coordinating notifications when one device 130 is preferred, according to an alternative embodiment. For example, process 350 may be performed by device 130 also configured to perform process 250 and not process 200 (i.e., a device 130 that does not periodically broadcast its own activity level when no notification information is incoming).

In step 352, device 130 may receive notification data. In step 354, device 130 may determine whether the notification data indicates an incoming phone call. If not, in step 360, device 130 may determine its activity level and proceed to step 362.

However, when the notification data indicates an incoming phone call, device 130 may proceed to step 356. In step 356, device 130 may set its activity level to a maximum value higher than the highest value in the activity scale (e.g., a rank of 14).

Because device 130 may necessarily have the highest possible activity rank after setting its activity level to a maximum value available, in step 358, device 130 may display the notification. Device 130 may proceed to step 362.

In step 362, device 130 may broadcast its own activity level, which may be either the maximum value available when the notification data indicates an incoming phone call or a determined level based on activity when the notification data does not indicate an incoming phone call.

FIG. 4 is a flow diagram of an example process 400 for coordinating notifications. Devices 110/120/130/140 may separately perform this process 400 whenever they receive notification data to decide whether to display a notification. Each device (e.g., device 110) may individually leverage its own activity level data and activity level data broadcast by other devices 120/130/140 to determine whether it should display the notification.

In step 401, device 110 may receive notification data. In step 402, device 110 may receive broadcasts from other devices 120/130/140. Each broadcast may contain activity level data for each respective device 120/130/140. As described above, in some embodiments devices 110/120/

130/140 may periodically broadcast their activity levels. In these embodiments, device 110 may use the most recently received activity level data broadcast by each other device 120/130/140. For example, device 110 may discard earlier-received activity levels for other devices 120/130/140 and store the most recently received activity levels for other devices 120/130/140 in device 110 memory as fresh broadcasts are received. Device 110 may receive notification data (step 401) before or after device 110 receives broadcasts from other devices 120/130/140.

In step 404, device 110 may compare its own activity level, which may be derived as described above with respect to FIGS. 2A-2B, with received activity levels for other devices 120/130/140.

In step 406, device 110 may decide whether to display or silence the notification based on the comparison of activity levels. If device 110 activity is ranked higher than (or, in some embodiments, equal to) any received activity levels, device 110 may proceed to step 408 and display the notification. If device 110 activity level is ranked below at least one received activity level, device 110 may proceed to step 410 and silence the notification, wherein silencing the notification may comprise ignoring the notification, actively silencing the notification, or preventing the notification from being displayed at all.

When each device 110/120/130/140 performs the processes of FIGS. 2A-4, extraneous notification display may be prevented and/or reduced, thereby providing an enhanced user experience, reducing processing demands on devices 110/120/130/140 not displaying the notification, and/or improving battery life of devices 110/120/130/140 by limiting the number of notifications any given device 110/120/130/140 displays.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Example System Architecture

Figure 5:
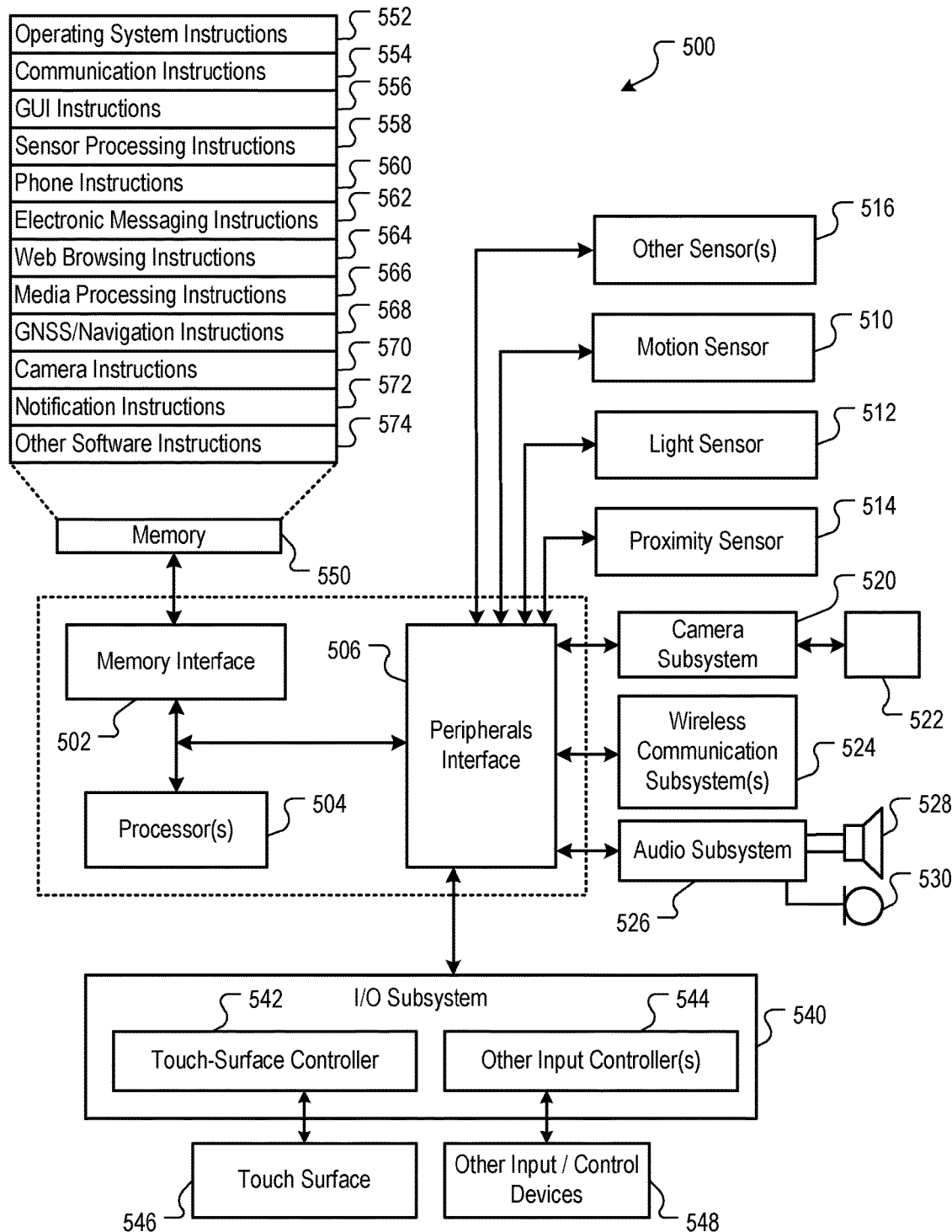
FIG. 5 is an example device configured for providing coordinated notifications.

FIG. 5 is a block diagram of an example computing device 500 that may implement the features and processes of FIGS. 1A-4. For example, computing device 500 may serve as one or more user devices 110-140 of network 100. The computing device 500 may include a memory interface 502, one or more data processors, image processors, and/or central processing units 504, and a peripherals interface 506. The memory interface 502, the one or more processors 504, and/or the peripherals interface 506 may be separate components or may be integrated in one or more integrated circuits. The various components in the computing device 500 may be coupled by one or more communication buses or signal lines.

Sensors, devices, and subsystems may be coupled to the peripherals interface 506 to facilitate multiple functionalities. For example, a motion sensor 510, a light sensor 512, and a proximity sensor 514 may be coupled to the peripherals interface 506 to facilitate orientation, lighting, and proximity functions. Other sensors 516 may also be connected to the peripherals interface 506, such as a global navigation satellite system (GNSS) (e.g., GPS receiver), a temperature sensor, a biometric sensor, magnetometer, or other sensing device, to facilitate related functionalities.

A camera subsystem 520 and an optical sensor 522, e.g., a charged coupled device (CCD) or a complementary metal-oxide semiconductor (CMOS) optical sensor, may be utilized to facilitate camera functions, such as recording photographs and video clips. The camera subsystem 520 and the optical sensor 522 may be used to collect images of a user to be used during authentication of a user, e.g., by performing facial recognition analysis.

Communication functions may be facilitated through one or more wireless communication subsystems 524, which can include radio frequency receivers and transmitters and/or optical (e.g., infrared) receivers and transmitters. For example, the BTLE and/or WiFi communications described above may be handled by wireless communication subsystems 524. The specific design and implementation of the communication subsystems 524 may depend on the communication network(s) over which the computing device 500 is intended to operate. For example, the computing device 500 may include communication subsystems 524 designed to operate over a GSM network, a GPRS network, an EDGE network, a WiFi or WiMax network, and a Bluetooth™ network. In particular, the wireless communication subsystems 524 may include hosting protocols such that the device 100 can be configured as a base station for other wireless devices and/or to provide a WiFi service as described above.

An audio subsystem 526 may be coupled to a speaker 528 and a microphone 530 to facilitate voice-enabled functions, such as speaker recognition, voice replication, digital recording, and telephony functions. The audio subsystem 526 may be configured to facilitate processing voice commands, voiceprinting, and voice authentication, for example.

The I/O subsystem 540 may include a touch-surface controller 542 and/or other input controller(s) 544. The touch-surface controller 542 may be coupled to a touch surface 546. The touch surface 546 and touch-surface controller 542 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of the speaker 528 and/or the microphone 530.

In one implementation, a pressing of the button for a first duration may disengage a lock of the touch surface 546; and a pressing of the button for a second duration that is longer than the first duration may turn power to the computing device 500 on or off. Pressing the button for a third duration may activate a voice control, or voice command, module that enables the user to speak commands into the microphone 530 to cause the device to execute the spoken command. The user may customize a functionality of one or more of the buttons. The touch surface 546 can, for example, also be used to implement virtual or soft buttons and/or a keyboard.

In some implementations, the computing device 500 may present recorded audio and/or video files, such as MP3, AAC, and MPEG files. In some implementations, the computing device 500 may include the functionality of an MP3 player, such as an iPod™. The computing device 500 may, therefore, include a 36-pin connector that is compatible with the iPod. Other input/output and control devices may also be used.

The memory interface 502 may be coupled to memory 550. The memory 550 may include high-speed random access memory and/or non-volatile memory, such as one or more magnetic disk storage devices, one or more optical storage devices, and/or flash memory (e.g., NAND, NOR). The memory 550 may store an operating system 552, such as Darwin, RTXC, LINUX, UNIX, OS X, WINDOWS, or an embedded operating system such as VxWorks.

The operating system 552 may include instructions for handling basic system services and for performing hardware dependent tasks. In some implementations, the operating system 552 may be a kernel (e.g., UNIX kernel). In some implementations, the operating system 552 may include instructions for performing voice authentication.

The memory 550 may also store communication instructions 554 to facilitate communicating with one or more additional devices, one or more computers and/or one or more servers. The memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions; and/or camera instructions 570 to facilitate camera-related processes and functions.

The memory 550 may store notification instructions 572 to facilitate other processes and functions, such as the coordinated notification processes and functions as described with reference to FIGS. 1A-4.

The memory 550 may also store other software instructions 574, such as web video instructions to facilitate web video-related processes and functions; and/or web shopping instructions to facilitate web shopping-related processes and functions. In some implementations, the media processing instructions 566 may be divided into audio processing instructions and video processing instructions to facilitate audio processing-related processes and functions and video processing-related processes and functions, respectively.

Each of the above identified instructions and applications may correspond to a set of instructions for performing one or more functions described above. These instructions need not be implemented as separate software programs, procedures, or modules. The memory 550 may include additional instructions or fewer instructions. Furthermore, various functions of the computing device 500 may be implemented in hardware and/or in software, including in one or more signal processing and/or application specific integrated circuits.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising, in a first device:
   storing activity ranking information that associates a plurality of device activities with respective activity ranking scores;
   receiving a notification of an incoming message by the first device;
   determining an activity currently being performed by the first device;
   comparing the activity currently being performed by the first device to the activity ranking information;
   determining a first ranking score for the first device based on the comparison, where the first ranking score is based on at least one of the activity ranking scores, wherein determining the first ranking score comprises:
      determining a highest-ranked activity from among at least one activity being performed by the first device; and
      determining the first ranking score for the first device based on the activity ranking score corresponding to the highest-ranked activity,
      wherein the at least one activity being performed by the first device is selected from a group comprising:
         a current connection with an in-car system having a first rank,
         a current connection with a wearable device having a second rank lower than the first rank,
         being in a condition of having been recently interacted with by a user having a third rank lower than the second rank,
         currently displaying active audio, video, or a combination thereof having a fourth rank lower than the third rank, being located relative to the at least one additional device having a fifth rank lower than the third rank, being in motion having a sixth rank lower than the third rank, and processing audio inputs, visual inputs, or a combination thereof having a seventh rank lower than the third rank;

receiving a broadcast from a second device that also received the notification of the incoming message, the broadcast including a second ranking score determined based on activities currently being performed by the second device;

comparing the first ranking score of the first device to the second ranking score of the second device; and in response to determining that the first ranking score of the first device is equal to or greater than the second ranking score, presenting the notification of the incoming message.

2. The method of claim 1, further comprising:

broadcasting an indication of the first ranking score of the first device; and suppressing the notification of the incoming message in response to determining that the first ranking score of the first device is less than the second ranking score.

3. The method of claim 2, further comprising encrypting the first ranking score of the first device before broadcasting.

4. The method of claim 1, wherein:

the first device is a smartphone; and the determining comprises setting the first activity score of the first device at a highest possible activity ranking score in response to a determination that the incoming message is a phone call.

5. The method of claim 1, wherein:

the first device is currently connected to an in-car system; and displaying the notification of the incoming message comprises causing, by the first device, the in-car system to display the notification.

6. The method of claim 1, wherein:

the first device is currently connected to a watch; and displaying the notification of the incoming message comprises causing, by the first device, the watch to display the notification.

7. A first device comprising:

a network interface;

one or more processors; and a computer readable medium including one or more sequences of instructions that, when executed by the one or more processors, causes the processors to:

store activity ranking information that associates a plurality of device activities with respective activity ranking scores;

receive a notification of an incoming message by the first device;

determine an activity currently being performed by the first device;

compare the activity currently being performed by the first device to the activity ranking information;

determine a first ranking score for the first device based on the comparison, where the first ranking score is based on at least one of the activity ranking scores, wherein the instructions that cause the processors to determine the first ranking score include instructions that cause the processors to:

determine a highest-ranked activity from among at least one activity being performed by the first device; and assign the first activity score to the first device based on the activity ranking score corresponding to the highest-ranked activity, wherein the at least one activity being performed by the first device is selected from a group comprising:

a current connection with an in-car system having a first rank, a current connection with a wearable device having a second rank lower than the first rank, being in a condition of having been recently interacted with by a user having a third rank lower than the second rank, currently displaying active audio, video, or a combination thereof having a fourth rank lower than the third rank, being located relative to the at least one additional device having a fifth rank lower than the third rank, being in motion having a sixth rank lower than the third rank, and processing audio inputs, visual inputs, or a combination thereof having a seventh rank lower than the third rank;

receiving a broadcast from a second device that also received the notification of the incoming message, the broadcast including a second ranking score determined based on activities currently being performed by the second device;

compare the first ranking score of the first device with the second ranking score of the second device; and in response to determining that the first ranking score of the device is equal to or greater than the second ranking score, cause the notification of the incoming message to be presented by the first device.

8. The first device of claim 7, wherein the instructions cause the processors to:

broadcast an indication of the first ranking score of the first device; and suppress the notification of the incoming message at the device in response to determining that the first ranking score of the first device is less than the second ranking score.

9. The first device of claim 7, wherein the instructions cause the processors to encrypt the first activity score of the first device before broadcasting.

10. The first device of claim 7, wherein:

the first device is a smartphone; and the determining comprises setting the first activity score of the first device at a highest possible score in response to a determination that the incoming message is a phone call.

11. The first device of claim 7, wherein:

the first device is currently connected to an in-car system; and displaying the notification of the incoming message comprises causing, with the first device, the in-car system to display the notification.

12. The first device of claim 7, wherein:

the first device is currently connected to a watch; and displaying the notification of the incoming message comprises causing, with the first device, the watch to display the notification.

13. A method comprising, in a first device:
receiving a notification of an incoming message by the first device;
determining one or more activities currently being performed by the first device;
determining a first ranking score for the first device by comparing the one or more activities currently being performed by the first device to activity ranking information that associates a plurality of device activities with respective activity ranking scores, wherein the first ranking score is based on at least one of the activity ranking scores, and wherein determining the first ranking score comprises:
 determining a highest-ranked activity from among at least one activity being performed by the first device; and
 determining the first ranking score for the first device based on the activity ranking score corresponding to the highest-ranked activity,
wherein the at least one activity being performed by the first device is selected from a group comprising:
 a current connection with an in-car system having a first rank,
 a current connection with a wearable device having a second rank lower than the first rank,
 being in a condition of having been recently interacted with by a user having a third rank lower than the second rank,
 currently displaying active audio, video, or a combination thereof having a fourth rank lower than the third rank,
 being located relative to the at least one additional device having a fifth rank lower than the third rank,
 being in motion having a sixth rank lower than the third rank, and
 processing audio inputs, visual inputs, or a combination thereof having a seventh rank lower than the third rank;
receiving a broadcast from a second device that also received the notification of the incoming message, the broadcast including a second ranking score determined based on at least one activity currently being performed by the second device;
comparing the first ranking score of the first device to the second ranking score of the second device;
in response to determining that the first ranking score of the first device is equal to or greater than the second ranking score, presenting the notification of the incoming message on the first device; and
in response to determining that the first ranking score of the first device is less than the second ranking score, suppressing the notification of the incoming message on the first device.

14. The method of claim 13, further comprising:
broadcasting an indication of the first ranking score of the first device.

15. The method of claim 13, further comprising encrypting the first ranking score of the first device before broadcasting.

16. The method of claim 13, wherein:
the first device is a smartphone; and
the determining comprises setting the first activity score of the first device at a highest possible activity ranking score in response to a determination that the incoming message is a phone call.

17. The method of claim 13, wherein:
the first device is currently connected to an in-car system; and
displaying the notification of the incoming message comprises causing, by the first device, the in-car system to display the notification.

18. The method of claim 13, wherein:
the first device is currently connected to a watch; and
displaying the notification of the incoming message comprises causing, by the first device, the watch to display the notification.

* * * * *